United States Patent [19]
Cornelius et al.

[11] 4,024,286
[45] May 17, 1977

[54] FORTIFICATION OF FOODSTUFFS WITH C-TERMINAL AMINO ACID SUBSTITUTED METHIONINE DIPEPTIDES

[75] Inventors: Dennis Alfred Cornelius, Elkhart; Moshe M. Sternberg, South Bend, both of Ind.

[73] Assignee: Miles Laboratories, Inc., Elkhart, Ind.

[22] Filed: May 17, 1976

[21] Appl. No.: 687,378

[52] U.S. Cl. .............................. 426/62; 426/104; 426/580; 426/588; 426/590; 426/648; 426/656; 426/657
[51] Int. Cl.$^2$ ................ A23J 3/00; A23L 1/30
[58] Field of Search .......... 426/656, 657, 580, 590, 426/62, 548, 534, 535, 588, 648, 104; 260/112.5 R

[56] References Cited
UNITED STATES PATENTS

| | | | |
|---|---|---|---|
| 2,851,482 | 9/1958 | Barker et al. | 426/656 X |
| 3,799,918 | 3/1974 | Mazur | 426/548 X |
| 3,952,115 | 4/1976 | Damico et al. | 426/656 X |
| 3,959,519 | 5/1976 | Johnson | 426/656 X |

*Primary Examiner*—Raymond N. Jones
*Assistant Examiner*—R. A. Yoncoskie
*Attorney, Agent, or Firm*—R. W. Winchell

[57] ABSTRACT

Nutritionally fortified foodstuffs and methods for producing the same are provided. The foodstuffs comprise an edible, methionine deficient protein and a nutritionally supplemental amount of a bland and water-soluble C-terminal amino acid substituted methionine dipeptide, wherein the amino acid substituent is selected from the class consisting of glycine, alanine, valine and glutamic acid.

12 Claims, No Drawings

FORTIFICATION OF FOODSTUFFS WITH C-TERMINAL AMINO ACID SUBSTITUTED METHIONINE DIPEPTIDES

BACKGROUND AND PRIOR ART

For years food scientists have had a continuing interest in producing palatable, nutritious proteinaceous foodstuffs from plant and low-cost animal sources as a supplement to or as a replacement for animal protein foods. The proteinaceous product must be economical, nutritionally well balanced and aesthetically acceptable to the human consumer, i.e. the product must be bland in flavor and odor and must be free of objectionable colors. At the present time, such proteinaceous food products are principally prepared from leguminous or cereal proteins. Unfortunately, these protein sources are relatively deficient in some essential amino acids such as methionine, lysine and the like. Such amino acids are referred to by nutritionists as "limiting". As a result, the protein's nutritive value is reduced to the content of the first limiting amino acid, thus requiring excessive consumption of the protein to provide the proper nutritive value.

It is well known that the nutritive quality of a protein material may be improved by the addition of a calculated amount of the deficient or "limiting" amino acids. It has been shown, for example, that the addition of lysine to corn protein considerably improves the nutritional quality of that protein. Similarly, supplementation of soybean protein with methionine has resulted in the improvement of its nutritional quality. Unfortunately, however, not all attempts to fortify amino acid-deficient foodstuffs with the free amino acid have been successful in terms of customer acceptance because of severely intractable flavor problems that arise in part from the intrinsic nature of the particular amino acid added. In addition to the inherent flavor properties of the free amino acids, other unpalatable flavors arise from degradative processes such as air oxidation and particularly as a result of the Strecker degradation of the amino acid (a reaction yielding noxious compounds such as mercaptans and sulfides). Because of these adverse flavor problems, alternate means for alleviating the amino acid deficiency, particularly methionine deficiency, have long been sought.

Various methods for improving the flavor problems coincident with the addition of methionine and other amino acids have received considerable attention. Those methods suggested in the prior art include the encapsulation of the free amino acid in an inert media, such as beef tallow; the simultaneous incorporation of certain anti-Browning agents to defeat the Strecker degradation; the application of the plastein reaction; the utilization of various protein blends such as corn protein with soya protein; and the utilization of derivatives of methionine or other amino acids that are tasteless, non-toxic, stable and yet are nutritionally available on ingestion.

Of the above-mentioned methods, some modicum of success has been achieved with the use of amino acid derivatives. Examples of such amino acid derivatives are DL-methionyl-DL-methionine (disclosed in German Patent Application No. 2,251,877, published Apr. 25, 1974) and N-acyl derivatives of sulfur-containing L-amino acids (disclosed in U.S. Pat. No. 3,878,305). Although each of these derivatives shows some promise in the fortification of proteinaceous foodstuffs, each has drawbacks which limit their practical utility. Specifically, DL-methionyl-DL-methionine is bland in taste, but it is almost totally insoluble in water and dilute acid. Thus, this derivative is not useful in the fortification of many foodstuffs which require a water-soluble or mildly acid soluble form for addition, such as in beverages. The N-acyl derivatives of methionine, such as N-acetyl-L-methionine, have an inherent characteristic sour, acid flavor which limits its use for palatably fortifying foodstuffs. It would therefore be highly desirable to provide palatable proteinaceous foodstuffs which are nutritiously fortified with bland, water soluble forms of "limiting" amino acids, particularly methionine, and to provide a method for producing such palatable and nutritiously fortified proteinaceous foodstuffs.

SUMMARY OF THE INVENTION

In accordance with the present invention, novel palatable and nutritious proteinaceous foodstuffs and methods are provided. The proteinaceous foodstuffs comprise an edible, methionine deficient protein and a nutritionally supplemental amount of a bland and water-soluble C-terminal amino acid substituted methionine dipeptide wherein the C-terminal amino acid substituent is a non-sulfur containing amino acid selected from the group consisting of glycine, alanine, valine and glutamic acid.

DESCRIPTION OF THE INVENTION

According to the Chemical Abstracts system of nomenclature, peptides are generally named by use of amino acid stereoparents and stereoparent radicals. The heading parent, by convention, is the C-terminal amino acid stereoparent, i.e. having a free carboxyl group. In a dipeptide, the amino acid stereoparent radical is the N-terminal amino acid residue, i.e. having a free amino group. For example, in the case of methionylglycine, glycine is regarded as the heading parent having the free carboxyl group. Methionine is regarded as the N-terminal stereoparent radical having the free amino group. Dipeptides such as methionylglycine, methionylalanine, methionylvaline, methionyl glutamate and the like are conveniently referred to herein as methionyl dipeptides.

The C-terminal amino acid substituted methionine dipeptides, i.e. methionyl dipeptides, which are used in the present invention include those derivatives of methionine which are substituted at the terminal carboxyl position on the methionine with a C-terminal amino acid selected from the group of glycine, α-alanine, valine and glutamic acid. Preferred amino acid substituents include glycine and alanine. Most preferred of the amino acid substituents is glycine. These methionine dipeptides are bland in taste and odor, stable to oxidation or degradation reactions, water soluble and nutritionally available on ingestion. Bland or bland taste, as used herein, are organoleptic responses by trained sensory personnel to sample compounds which possess very slightly, if any, undefined flavors but no objectionable off-flavors.

The methionyl dipeptides of this invention are prepared by methods which are well-known in the art. One such method is based on the conversion of the DL- or L- form of methionine, which carries the reactive carbonyl group, into its N-carboxyanhydride (NCA) derivative as described in Nature, 165:647 (1950). The methionine NCA derivative is obtained by treatment of methionine with phosgene in a dry inert solvent such as dioxane, ether, toluene and the like. The amino group on the methionine is thus protected against any combination with the carbonyl group of the other amino acid reactant to be substituted. The NCA derivative of methionine is then treated with the selected amino acid substituent at a pH of about 10.2 to 10.5 at about 0° to 2° C to produce the bisanion of the dipeptide carbamate which is decarboxylated by acidification to give the unprotected dipeptide as described in J. Org. Chem, 32:3415 (1967). The crude dipeptide may then be purified by well-known methods such as ion-exchange chromatography, solvent extraction, recrystallization and the like to obtain the optically pure or the racemic mixture of the methionyl dipeptide. Another method for the preparation of the methionyl dipeptide is disclosed in J. Biol. Chem., 180, 155, 167 (1949).

All of the amino acid reactants and their isomers are well known and commercially available. Either the DL-racemic mixture or the D- or L- stereoisomeric forms of the amino acids may be used. Most preferred is the DL-racemic mixture of methionine and the L-stereoisomeric form of other amino acid reactants.

The proteinaceous foodstuffs which are improved by the present invention include those which are edible and deficient in methionine. Such foodstuffs include those used as raw materials or as intermediates in the preparation of finished foodstuffs and as finished foodstuffs each of which is derived from plant or animal proteinaceous materials. The invention is preferably concerned with the fortification of foodstuffs derived from plant sources such as leguminous seeds, oilseeds, cereals, yeasts and the like, principally from the soybean.

Examples of raw materials which are improved by the present invention include various protein fractions of the leguminous and other proteins, as characterized by their protein content and method of preparation such as meals, flours, concentrate and isolate. Such leguminous seed proteins include soybeans, peanuts, cottonseeds, sunflower seed and the like. The most preferred leguminous protein is soybean. Other raw materials include casein, corn gluten, fish protein concentrate, non-fat milk solids, wheat germ, wheat gluten, whey protein, yeast, lactalbumin, microbial protein and the like.

Examples of intermediates used in the preparation of finished foodstuffs which are improved by the present invention include autolyzed yeast extracts, hydrolyzed vegetable proteins, texturized forms of vegetable proteins, such as protein extrudates, wet-spun proteinaceous filaments, melt-spun proteinaceous filaments, creped protein, scraped-cross-folded protein and the like.

Examples of finished proteinaceous foodstuffs which are improved by this invention include textured vegetable protein meat analogues, vegetable portein cheese analogues, beverages such as soya milk or milk substitutes prepared from vegetable proteins, textured vegetable meat extenders and the like.

The proteinaceous foodstuffs contemplated by this invention are fortified with a nutritionally supplemental amount of the methionyl dipeptide based upon the amino acid profile of the proteinaceous material, particularly based upon the methionine deficiency. Such nutritional information which is necessary to determine the amount of methionine to add is freely available. One such publication is available from the Food and Agricultural Organization of the United Nations entitled "Amino Acid Content of Foods and Biological Data on Proteins", No. 24 (1970). The nutritionally effective amount to be added to a particular foodstuff can be easily determined by those skilled in the art given the proteinaceous foodstuff and its amino acid deficiency and amino acid availability. Typically, the methionyl dipeptide will be added at the rate of about 0.1 to 5.0 weight percent of methionine equivalents based on the total protein content of the foodstuff. Where the foodstuff is derived from soybeans, the amount added will preferably vary from about 0.1 to 2.0 weight percent methionine equivalents based on the total protein content. Methionine equivalent is defined as that quantity of the methionyl dipeptide which is nutritionally the equivalent of the free methionine amino acid. For the purposes of calculating the methionine equivalent, the methionyl dipeptide is considered completely available for nutrition.

The methionyl dipeptide of this invention can be added to a methionine deficient foodstuff to obtain a fortified proteinaceous foodstuff by any of the conventional methods that are known in the art to use with a particular foodstuff. For example, the methionyl dipeptide may be added as a dry powder, as an aqueous solution or in combination with other ingredients such as flavors or as a dispersion in some inert vehicle. Due to the water solubility of the methionyl dipeptides, aqueous solutions can be prepared and incorporated in beverages or incorporated with a foodstuff by spraying. Such methods are well known to those skilled in the art.

The following examples are provided as illustrations of the invention and are not intended to limit the scope thereof.

EXAMPLE I

This Example illustrates a typical preparation of the methionyl dipeptide of this invention.

A. Preparation of DL-methionine-N-carboxyanhydride

A 500 ml reaction vessel was charged with 14.0 g (0.094 mol) of DL-methionine (Aldrich Chemical Company, Inc., Beil. 4(2),938) and 200 ml of dioxane (twice distilled from sodium). The vessel was purged with nitrogen and the reaction mixture was warmed to about 40° to 45° C. Phosgene was then slowly passed into the reaction mixture with stirring for a time sufficient to completely dissolve the solids (ca. 30 min). Excess phosgene was removed by nitrogen purging. The reaction mixture was then filtered and the filtrate was concentrated by evaporation to yield an oil which solidified after standing under a high vacuum overnight. A portion of the crude title compound was further purified by recrystallization from 1,2-dichloroethane. The title compound had a melting point of 67° to 69° C.

B. Preparation of DL-methionylglycine

A solution containing 1.50 g (0.02 mol) of glycine (Aldrich Chemical Company, Inc., Biel. 4,333) in 175 ml of cold (0° C) sodium borate buffer (pH 10.2) was prepared. The crude DL-methionine-N-carboxyanhydride (prepared in Example 1A) was diluted to about 40 ml with anhydrous acetone. Ten ml (ca. 0.023 mol) of this acetone-NCA solution was then added to the glycine-borate buffer solution with rapid mixing. The pH of the resulting solution was adjusted and maintained at 10.2 by the addition of 4N NaOH. The reaction was completed in 1 to 2 min. The pH of the mixture was then adjusted to pH 7.0 by addition of concentrated HCl. The reaction mixture was filtered and the filtrate was desalted on a 4 × 40 cm anion-exchange column of Dowex 2X-8 (OH⁻ form) (Dow Chemical Co.). The column was washed with water until the pH of the elute was neutral, then the column was eluted with 2000 ml of 1.0N acetic acid. Fractions, 100 ml in volume, were collected and assayed for positive ninhydrin reaction. All ninhydrin positive fractions were combined and concentrated to ca. 50 ml by evaporation. The desalted filtrate was lyophilized to give a white solid. A thin-layer chromatogram (TLC), of this material on cellulose sheets using butanol, acetic acid, water (4:1:5, upper phase) for elution and ninhydrin for development showed spots at $R_f 0.16$ (glycine), $R_f 0.42$ (product), $R_f 0.48$ (methionine) and $R_f 0.61-0.80$ (unidentified).

One gram of the crude, desalted product above was dissolved in a minimum amount of 1.0N acetic acid and applied to a 1.8 × 35 cm cation exchange column of Amberlite CG-120(200–400 mesh) (Rohm and Haas Co.) resin that had been equilibrated with 0.2N ammonium acetate buffer (pH 4.25). The column was eluted with about 1000 ml of the ammonium acetate buffer at a flow rate of 15 ml/hr to remove free glycine and methionine. The column was then eluted with 0.2N ammonium acetate buffer (pH 7.00). Fractions were collected as before, combined, concentrated and lyophilized to yield the title compound as a white solid, mp 210°–212°(d). The compound was found to be water soluble.

Hydrolysis of 10 mg of this solid in 1.0 ml of 6N HCl for 24 hr at 100° C gave two spots by TLC corresponding to glycine and methionine.

A taste test of this derivative revealed that it had a slightly saline taste with no noticeable sulfur aftertaste.

EXAMPLE 2

Preparation of L-methionylglycine

The title compound was prepared according to the procedures of Example 1A and B above by replacing DL-methionine with L-methionine (Aldrich Chemical Co., Beil. 4(2),938). The title compound had a melting point of 188° to 190° C (d). The compound was found to be water soluble. The product thus obtained was subjected to amino acid analysis and found to contain 49.42 mole percent glycine and 50.58 mole percent methionine.

A taste test of this derivative revealed that it had a bland taste.

EXAMPLE 3

Preparation of L-methionyl-L-alanine

The title compound was prepared according to the procedures of Example 1A and B above by replacing DL-methionine and glycine respectively with L-methionine and L-alanine (Aldrich Chemical Co., Beil. 4,381). The title compound had a melting point of 141° to 143° C (d). The compound was found to be water soluble. The product thus obtained was subjected to amino acid analysis and found to contain 49.40 mole percent alanine and 50.60 mole percent methionine.

A taste test of this derivative revealed that it had a bland taste.

EXAMPLE 4

Preparation of L-methionyl-L-valine

The title compound was prepared according to the procedure of Example 1A and B above by replacing DL-methionine and glycine respectively with L-methionine and L-valine (Aldrich Chemical Co., Beil 4,427). The title compound had a melting point of 227° to 229° C (d). The title compound was found to be water soluble. The product thus obtained was subjected to amino acid analysis and found to contain 49.44 mole percent valine and 50.56 mole percent methionine.

A taste test of this compound revealed that it had a bland taste.

EXAMPLE 5

Preparation of L-methionyl-L-glutamate

The title compound was prepared according to the procedure of Example 1A and B above by replacing DL-methionine and glycine respectively with L-methionine and L-glutamic acid (Aldrich Chemical Co., Beil 4,488). The title had a melting point of 202° to 204° C (d). The title compound was found to be water soluble. The product thus obtained was subjected to amino acid analysis and found to contain 49.4 mole percent glutamic acid and 50.69 mole percent methionine.

A taste test of this compound revealed that it had a bland taste.

EXAMPLE 6

Preparation of glycyl-DL-methionine

This example shows that all amino acid substituted methionine dipeptides are not in this invention.

The title compound was prepared according to the procedure of Example 1A and B above by replacing DL-methionine and glycine respectively with glycine and DL-methionine. The title compound had a melting point of 215° C.

A taste test of this compound revealed that it had an initial and lingering, bitter, sulfurous and disagreeable taste.

EXAMPLE 7

This example illustrates the stability of methionyl dipeptides to thermal decomposition and hydrolysis.

Simple dipeptides are known to undergo facile, thermally induced cyclization reactions to yield biologically unavailable diketopiperazines. The following method was used to determine the thermal stability of the dipeptide. This method depends on the fact that methionyl dipeptides give positive tests with ninhydrin while diketopiperazines give negative ninhydrin tests.

An aqueous solution of DL-methionylglycine (2.5 mg/ml) was heated at 80° C for 4 hours. Samples (200 μl) were removed periodically during this time and to these samples there was added 1.0 ml of 2 weight percent ninhydrin and 1.0 ml of 10 volume percent pyridine. These ninhydrin treated solutions were heated at 80° C for 20 min to develop color and then diluted to 20 ml with water. The optical density of the resulting solution was determined at 570 nm. For comparison, unheated aqueous solutions of DL-methionylglycine were similarly analyzed. The results indicated that there was no decrease in the ninhydrin value of the sample which had been heated when compared with the unheated control. This indicates that no detectable decrease in the amount of methionylglycine after heating had occurred.

A portion of the heated aqueous solution of DL-methionylglycine prepared above was analyzed by thin-layer chromatography and developed using ninhydrin. This was compared with a similarly prepared but unheated solution of the dipeptide as well as with methionine and glycine. Only one spot corresponding to the dipeptide was detected. Since no free methionine or glycine were detected, this indicates that no detectable hydrolysis of the methionyl dipeptide had occurred.

EXAMPLE 8

This example illustrates the stability of the methionyl dipeptide in a meat analog foodstuff.

A portion of DL-methionylglycine was added as a dry powder to an intermediate meat analog foodstuff (sausage patties), before finish processing, corresponding to 1.0 and 2.0 weight percent of methionine equivalents based on the total protein. The fortified samples were finished by autoclaving the sample at 100° C for 1 hr. Samples of the product were taken before and after autoclaving, lyophilized, extracted with hexane, acid hydrolyzed and analyzed for the methionine content using an amino acid analyzer. The results indicated that there was no decrease in methionine caused by autoclaving. This indicates that methionine was not destroyed by any Maillard-type reactions, a frequent cause of browning in foodstuffs.

EXAMPLE 9

This example illustrates the bland nature of the methionyl dipeptide.

A portion of DL-methionylglycine was added as a dry powder to meat analog sausage patties corresponding to 1.0 and 2.0 weight percent of methionine equivalents based on the total protein. The fortified samples were autoclaved at 100° C for 1 hr and subsequently fried at 180° C for 10 min. No unusual odors or color changes were observed. Samples of the analog containing the two levels of dipeptide and an unfortified sample (control), but similarly processed, were evaluated for flavor by a 24-member trained sensory panel. Samples were evaluated individually on a Hedonic scale from 1.0 to 9.0, where 1.0 indicates the sample was extremely disliked and where 9.0 indicates the sample was extremely liked. The mean evaluation point for each sample was as follows: control, 6.08; 1.0% methionylglycine, 5.45; and 2.0% methionylglycine, 5.58. A one-way analysis of the taste panel data revealed that there was a nonsignificant difference in the flavor evaluation of the three samples. This data indicates the methionyl dipeptides do not adversely affect the taste of a finished foodstuff.

EXAMPLE 10

A portion of L-methionyl-L-alanine was added to meat analog sausage patties at a level corresponding to 1.0 weight percent methionine equivalents based on the total protein content. The fortified meat analogs were processed in the same manner described in Example 8 above and evaluated by a trained sensory panel. When compared with an unfortified but similarly processed control, no significant differences in flavor were observed.

EXAMPLE 11

This example illustrates the nutritional availability of the methionyl dipeptide.

Samples of DL-methionylglycine were added as a dry powder to a methionine-deficient isolated soybean protein (Promine D, available from Central Soya, Inc.) to give animal diets containing 0.14, 0.28, 0.55, 1.11 and 2.21 weight percent of the methionyl dipeptide based on the total protein content respectively corresponding to 0.1, 0.2, 0.4, 0.8 and 1.6 weight percent of free DL-methionine. In addition, animal diets containing 0.1, 0.2, 0.4, 0.8 and 1.6 weight percent DL-methionine were added to isolated soybean protein based on the total protein content and were made isonitrogenous with the methionyl dipeptide diets by the respective addition of 0.05, 0.1, 0.2, 0.4 and 0.8 weight percent free glycine based on the total protein. Conventional feeding studies on growing white rats demonstrated nearly identical growth curves for both diets. This data indicates that the methionyl dipeptide is completely and nutritionally available on ingestion.

EXAMPLE 12

This example illustrates a taste comparison between DL-methionylglycine and N-acetyl-L-methionine (U.S. Pat. No. 3,878,305).

Samples of Soyamel (A soya milk product available from Worthington Foods) were fortified with DL-methionylglycine and N-acetyl-L-methionine (Aldrich Chemical Co., Merck Index 8,12) at the levels of 1 and 2 weight percent methionine equivalent based on the total protein content. A four member trained sensory panel evaluated these fortified products with an untreated control. Those samples treated with N-acetyl-L-methionine were found unacceptable because of strong metallic taste and undesirable mouthfeel characteristics. The DL-methionylglycine treated samples were acceptable but said to be tart at both levels of fortification.

Soyamel fortified with the 2% level of DL-methionylglycine was evaluated in a triangular test with an untreated control by an experienced 10-member trained sensory panel. Only three members identified the fortified sample correctly. Of these three members, two members preferred the control and one member had no preference. Based upon these results, it is clear that the methionyl dipeptide can be used at these levels without causing appreciable changes in flavor.

What is claimed is:
1. A proteinaceous foodstuff comprising an edible, methionine deficient protein and a nutritionally supplemental amount of a bland and water-soluble C-terminal amino acid substituted methionine dipeptide, wherein the C-terminal amino acid substituent is selected from the group consisting of alanine, valine and glutamic acid.
2. The foodstuff of claim 1 wherein the dipeptide is L-methionyl-L-alanine.
3. The foodstuff of claim 1 wherein the dipeptide is L-methionyl-L-valine.
4. The foodstuff of claim 1 wherein the dipeptide is L-methionyl-L-glutamic acid.
5. The foodstuff of claim 1 wherein the protein is derived from vegetable protein.
6. The foodstuff of claim 5 wherein the protein is derived from soybeans.

7. The foodstuff of claim 1 wherein the foodstuff is selected from the group consisting of leguminous seed protein fractions, casein, corn gluten, fish protein concentrate, non-fat milk solids, wheat germ, wheat gluten, whey protein, yeast, lactalbumin, autolyzed yeast extracts, hydrolyzed vegetable proteins, texturized forms of vegetable proteins, textured vegetable protein meat analogues, vegetable protein cheese analogues and beverages.

8. A method of fortifying protein foodstuffs with amino acids comprising adding to said foodstuff a nutritionally effective amount of a bland and water-soluble C-terminal amino-acid substituted methionine dipeptide, wherein the C-terminal amino-acid substituent is selected from the group consisting of alanine, valine, and glutamic acid.

9. The method of claim 8 wherein the dipeptide is L-methionyl-L-alanine.

10. The method of claim 8 wherein the dipeptide is L-methionyl-L-valine.

11. The method of claim 8 wherein the dipeptide is L-methionyl-L-glutamic acid.

12. The fortified foodstuff product prepared by the process of claim 8.

* * * * *